United States Patent [19]
Tugukuni et al.

[11] 3,897,381
[45] July 29, 1975

[54] PROCESS FOR PREPARATION OF THERMOSETTING RESINOUS COMPOSITIONS

[75] Inventors: Hideyoshi Tugukuni, Osaka; Masafumi Kano, Kyoto; Yoshihisa Chikazoe, Osaka, all of Japan

[73] Assignee: Dai Nippon Toryo Co., Ltd., Osaka, Japan

[22] Filed: Oct. 17, 1973

[21] Appl. No.: 407,158

[30] Foreign Application Priority Data
Oct. 21, 1972   Japan.............................. 47-105644

[52] U.S. Cl. 260/29.2 TN; 117/132 B; 117/DIG. 7; 260/22 TN; 260/29.2 EP; 260/29.6 R
[51] Int. Cl....................... C08g 22/06; C08g 22/20
[58] Field of Search... 260/22 TN, 29.2 TN, 29.6 R, 260/29.2 EP

[56] References Cited
UNITED STATES PATENTS

| | | | |
|---|---|---|---|
| 3,108,084 | 10/1963 | Whitehill et al................ | 260/22 TN |
| 3,471,425 | 10/1969 | Ehring et al.................... | 260/22 TN |
| 3,509,103 | 4/1970 | Teague et al.................. | 260/29.2 TN |
| 3,509,234 | 4/1970 | Burlant et al................... | 260/22 TN |
| 3,624,020 | 11/1971 | Klebert et al.................. | 260/29.2 TN |
| 3,629,169 | 12/1971 | Bedighian...................... | 260/22 CB |
| 3,639,315 | 2/1972 | Rodriguez...................... | 260/22 TN |
| 3,726,819 | 4/1973 | Dijkhuizen..................... | 260/22 CB |
| 3,730,927 | 5/1973 | Schloss........................... | 260/29.2 TN |
| 3,748,293 | 7/1973 | Torelli............................. | 260/22 CB |
| 3,786,010 | 1/1974 | Tsugukuni et al............. | 260/21 |

FOREIGN PATENTS OR APPLICATIONS

| | | | |
|---|---|---|---|
| 947,973 | 1/1964 | United Kingdom........... | 260/22 TN |

*Primary Examiner*—Ronald W. Griffin
*Attorney, Agent, or Firm*—Haseltine, Lake & Waters

[57] ABSTRACT

This invention relates to a process for the preparation of a thermosetting resinous composition which comprises polymerizing (a) a water-soluble resin having an acid group of an acid value of 5 to 300 neutralized with a basic substance and (b) at least one $\alpha,\beta$-ethylenically unsaturated monomer, at least one of said components (a) and (b) containing a group capable of releasing an isocyanate group under heating, the polymerization being conducted in water at a temperature lower than the isocyanate-releasing temperature, and to a process for the preparation of a powdery thermosetting resinous composition which comprises spray-drying the aqueous dispersion obtained according to the above process.

10 Claims, No Drawings

PROCESS FOR PREPARATION OF THERMOSETTING RESINOUS COMPOSITIONS

DESCRIPTION OF THE PRIOR ART

Methods for preparing stable aqueous polymer dispersions by polymerizing monomers in an aqueous medium in the presence of an emulsifier, a protective colloid or the like are known in the art. For instance, it is known that an aqueous polymer dispersion can be obtained by polymerizing vinyl acetate monomer in the presence of sodium polyacrylate, polyvinyl alcohol or the like. However, a film obtained by baking and drying an aqueous dispersion prepared by this method is poor in water resistance and corrosion resistance because of the presence of the emulsifier left in the baked film.

As an improvement of this method, there is known a method comprising conducting polymerization in an aqueous medium with use of a water-soluble, polymerizable emulsifier to obtain an aqueous dispersion of a polymer containing said polymerizable emulsifier in the polymer skeleton (see, for example, Japanese Patent publication No. 20630/69). In this method, a mixture of a conjugate diolefin and a vinyl compound copolymerizable therewith are polymerized in an aqueous medium in the presence of a monoester of an alcohol having at least 8 carbon atoms with an $\alpha,\beta$-unsaturated dicarboxylic acid.

There is also known a method for preparing a stable aqueous dispersion by polymerizing polymerizable monomers in the presence of at least one emulsifier selected from water-soluble, natural, denatured and synthetic macromolecular substances (see, for instance, Japanese Patent publication No. 15033/70).

In these known methods, the water-soluble macromolecular substance is used merely for emulsifying and stabilizing the resulting polymer, and in none of these known methods, the water-soluble macromolecular substance is used as the main film-forming component. Further, films prepared from these aqueous dispersions containing such water-soluble macromolecular substance as the emulsifier are insufficient in water resistance and physical properties.

As another known method for preparing aqueous dispersions, there is mentioned a method comprising polymerizing a polymerizable monomer in the presence of a water-soluble resin in the state dissolved in a water-miscible organic solvent such as ethyl cellosolve and butyl cellosolve to form a solution of a block or graft copolymer and dispersing the so formed solution into water. However, this method is defective in that since the polymer solution to be dispersed in water has an excessively high viscosity, the step of dispersing the polymer solution into water involves difficulties; if an aqueous dispersion is prepared in spite of these difficulties, its stability is extremely poor; and if the stability is improved in such dispersion, the resin content in the dispersion is much reduced.

SUMMARY OF THE INVENTION

This invention relates to process for preparing a thermosetting resinous composition which comprises polymerizing ($a$) a water-soluble resin having an acid group of an acid value of 5 to 300 neutralized with a basic substance and ($b$) at least one $\alpha,\beta$-ethylenically unsaturated monomer, at least one of said components ($a$) and ($b$) containing a group capable of releasing an isocyanate group under heating, the polymerization being conducted in water at a temperature lower than the isocyanate-releasing temperature, and to a process for preparing a powdery thermosetting resinous composition which comprises spray-drying the composition obtained according to the above process.

DETAILED DESCRIPTION OF THE INVENTION

This invention has been accomplished as a result of our research work made with a view to developing a process for the preparation of thermosetting resinous compositions which can overcome the above mentioned defects involved in the conventional techniques, and objects of this invention are as follows:

1. To obtain a thermosetting resinous composition having a self-cross-linking property
2. To prepare a thermosetting resinous composition stably without causing viscosity increase or gelation
3. To obtain a thermosetting resinous composition having an excellent storage stability
4. To obtain a thermosetting resinous composition having a low viscosity and a high non-volatile component content
5. To obtain a thermosetting resinous composition which can give a film excellent in water resistance, alkali resistance and other properties Thermosetting resinous compositions of this invention can be prepared, for instance, by the following processes:

I. A process for preparing a thermosetting resinous composition in the form of an aqueous dispersion or in the powdery form, which comprises homopolymerizing or copolymerizing ($b$) an $\alpha,\beta$-ethylenically unsaturated monomer capable of releasing an isocyanate group under heating or a mixture of said $\alpha,\beta$-ethylenically unsaturated monomer and other unsaturated monomer copolymerizable therewith in water at a temperature lower than the isocyanate-releasing temperature in the presence of ($a$) a water-soluble resin containing an acid group of an acid value of 5 to 300 neutralized with a basic substance and being free of a group capable of releasing an isocyanate group under heating, and, if necessary, spray-drying the resulting aqueous dispersion at a temperature lower than the isocyanate-releasing temperature.

II. A process for preparing a thermosetting resinous composition in the form of an aqueous dispersion or in the powdery form, which comprises homopolymerizing or copolymerizing ($b$) an unsaturated monomer free of a group capable of releasing an isocyanate group under heating or a mixture of said unsaturated monomer with an $\alpha,\beta$-ethylenically unsaturated monomer capable of releasing an isocyanate group under heating in water at a temperature lower than the isocyanate-releasing temperature in the presence of a water-soluble resin containing an acid group of an acid value of 5 to 300 neutralized with a basic substance and a group capable of releasing an isocyanate group under heating, and, if necessary, spray-drying the resulting aqueous dispersion at a temperature lower than the isocyanate-releasing temperature.

As the water-soluble resin to be used in this invention, there can be mentioned, for instance, alkyd resins, acid adducts of drying or semi-drying oils, epoxy ester resins, acrylic resins and the like. Some of these resins are neutralized with basic substances to render them sufficiently water-soluble.

Alkyd resins synthesized from a polyhydric alcohol component, a polybasic acid component and an oil component according to a customary method can be used in this invention. More specifically, there are employed alkyd resins prepared from one or more polyhydric alcohol components such as ethylene glycol, propylene glycol, diethylene glycol, butylene glycol, 2,2-dimethylolpropane diol, glycerin, trimethylolethane, trimethylolpropane, 1,2,6-hexane triol, pentaerythritol, sorbitol, diglycerol and dipentaerythritol; one or more polybasic acid components such as phthalic anhydride, isophthalic acid, trimellitic anhydride, tetrahydrophthalic anhydride, maleic anhydride, fumaric acid, tetrachloromaleic anhydride, HET acid, succinic acid, adipic acid and sebacic acid; and one or more of oil components such as castor oil, dehydrated castor oil, tung oil, safflower oil, soybean oil, linseed oil, coconut oil, cotton seed oil, tall oil, olive oil, rice bran oil, and fatty acids of these oils.

The acid-adduct of a drying or semi-drying oil to be used in this invention includes reaction products between a drying or semi-drying oil such as linseed oil, soybean oil, cotton seed oil, sesame oil, rape oil, tung oil, perilla oil, dehydrated castor oil, other oils, fatty acids of these oils and synthetic drying oils, e.g., polybutadiene, and an acid component such as maleic anhydride, maleic acid, fumaric acid, maleic anhydride derivatives, acrylic acid, methacrylic acid, itaconic acid and the like. In general, use of products called maleic oil resins is preferred.

As an instance of the epoxy ester resin to be used in this invention, there can be mentioned a reaction product between an alkyd resin such as mentioned above and an epoxy resin such as a condensation product of bis-phenol A with epichlorohydrin.

As the acrylic resin to be used in this invention, there can be mentioned resins comprising one or more unsaturated carboxylic acids such as acrylic acid, methacrylic acid, maleic acid, maleic anhydride, fumaric acid, crotonic acid and itanconic acid. If necessary, these resins can further comprise, as comonomer components, hydrophilic monomer such as 2-hydroxyethyl acrylate, 2-hydroxypropyl acrylate, 2-hydroxyethyl methacrylate, 2-hydroxpropyl methacrylate, allyl alcohol, glycidyl methacrylate, N-methylol acrylamide, N-n-butoxymethyl acrylamide, acrylamide and diacetone acrylamide, and/or other monomers such as acrylic acid esters, e.g., methyl acrylate, ethyl acrylate and propyl acrylate, methacrylic acid esters, e.g., methyl methacrylate, ethyl methacrylate and propyl methacrylate, acrylonitrile, styrene and vinyl acetate.

It is desired that the water-soluble resin has a -OH group as an active hydrogen-containing group.

Introduction of a group capable of releasing an isocyanate group under heating into the foregoing water-soluble resin can be performed by copolymerizing or blockor graft-polymerizing as one structural component of the water-soluble resin an $\alpha,\beta$-ethylenically unsaturated monomer capable of releasing an active isocyanate group under heating, which will be detailed hereinafter.

The water-soluble resin contains an acid group having an acid value of 5 to 300. If the acid value of the acid group exceeds 300, a film prepared from the resulting thermosetting composition is extremely poor in such properties as water resistance, alkali resistance and flexibility. If the acid value of the acid group of the water-soluble resin is less than 5, the ability of the water-soluble resin to be diluted with water is lowered and such undesired phenomena as phase separation and sedimentation occur during the preparation process.

In this invention, resins having an acid value lower than 30, which is said to be critical acid value rendering resins water-soluble, can be used. The reason is that since a highly hydrophilic monomer such as an amine imide monomer, 2-hydroxyethyl acrylate and acrylamide is used in combination, the property of being diluted with water can be improved in the entire system by the presence of such hydrophilic monomer. Accordingly, even when the acid value of the water-soluble resin is lower than 30, as long as it is at least 5, such undesired phenomena as phase separation and sedimentation do not occur.

As the basic substance to be used for neutralizing the acid group of the water-soluble resin, there can be mentioned, for instance, inorganic alkali substances such as lithium hydroxide, water-soluble amines such as ammonia, monomethyl amine, dimethyl amine, trimethyl amine, monoethyl amine, diethyl amine, triethyl amine, mono-n-propyl amine and dimethyl-n-propyl amine, and water-soluble hydroxy amines such as monoethanol amine, diethanol amine, triethanol amine, N-methylethanol amine, N-aminoethylethanol amine, N-methyldiethanol amine, monoisopropanol amine, diisopropanol amine, triisopropanol amine and hydroxyl amine. These basic substances can be used singly or in the form of admixtures of two or more of them. The neutralization can be performed according to a customary method. In this invention, the degree of the neutralization may be such that a part or all of the carboxylic acid component is neutralized. The so obtained water-soluble resins can be used singly, and, if necessary, a mixture of two or more of these water-soluble resins may be used.

The "$\alpha,\beta$-ethylenically unsaturated monomer capable of releasing an isocyanate group under heating" (hereinafter referred to as a latent isocyanate-containing monomer) to be used in this invention has a double bond $>C=C<$ in the molecule and is selected from (1) amine imide monomers (2) polyisocyanates in which one of the isocyanate groups is reacted with an active hydrogen-containing, $\alpha,\beta$-ethylenically unsaturated monomer and the remaining isocyanate groups are blocked with an active hydrogen-containing compound, and (3) vinyl isocyanates blocked with an active hydrogen-containing compound.

As the amine imide monomer (1), there can be mentioned, for instance, trimethylamine methacrylimide, 1,1-dimethyl-1-(2-hydroxypropyl)amine methacrylimide and 1,1-dimethyl-1-(2,3-dihydroxypropyl)amine methacrylimide.

The polyisocyanate (2) in which one of the isocyanate groups is reacted with an active hydrogen-containing, $\alpha,\beta$-ethylenically unsaturated monomer and the remaining isocyanate groups are blocked with an active hydrogen-containing compound is prepared, for instance, by (i) obtaining a dior polyisocyanate, a polyisocyanate having a biuret structure or a polyisocyanate having an allophanate structure by reacting a polyisocyanate such as ethylene diisocyanate, hexamethylene diisocyanate, decamethylene diisocyanate, phenylene diisocyanate, tolylene diisocyanate, naphthylene diisocyanate, 4,4'-methylenebis(phenylisocyanate), 4,4'-ethylene-bis(phenylisocyanate), 3,3'-diisocyanate-1,4-dimethylbenzene, 1-methyl-2,4-diisocyanate-cyclohexanone, 3,3'-diisocyanate-diethylbenzene, 3,3'-diisocyanate-dimethyltoluene, 3,3'-diisocyanate-dimethylxylene, 3,3'-diisocyanate-diethylxylene, 4,4'-methylene-bis(cyclohexylisocyanate), 4,4'-ethylene-bis(cyclohexylisocyanate), isophoronediamine diisocyanate, lysine isocyanate and triphenylmethane isocyanate or an excess of such polyisocyanate with a low-molecular-weight polyol such as ethylene glycol, propylene glycol, 1,3-butylene glycol, neopentyl glycol, 2,2,4-trimethyl-1,3-pentane diol, hexamethylene glycol, cyclohexane dimethanol, trimethylol propane, hexane triol, glycerin, sorbitol, sucrose and pentaerythritol to cause addition reaction and chain extension; (ii) reacting the resulting polyisocyanate with an active hydrogen-containing monomer such as a hydroxyl group-containing monomer, e.g., 2-hydroxyethyl acrylate, 2-hydroxylpropyl acrylate, 2-hydroxyethyl methacrylate, 2-hydroxypropyl methacrylate, allyl alcohol, cinnamic alcohol and crotonyl alcohol, an unsaturated carboxylic acid, e.g., acrylic acid, methacrylic acid, maleic acid, fumaric acid, crotonic acid and itaconic acid, or an epoxy or amide group-containing acrylic monomer, e.g., glycidyl methacrylate, acrylamide and methacrylamide, and (iii) blocking the remaining isocyanate groups with an active hydrogen-containing compound of the phenol, lactam, active methylene, alcohol, mercaptan, acid amide, imide, amine, imidazole, urea, carbamate, imine, oxime or sulfite type.

The vinyl isocyanate monomer (3) blocked with an active hydrogen-containing compound is prepared, for instance, by chlorinating an unsaturated carboxylic acid such as acrylic acid, methacrylic acid, $\beta,\beta'$-dimethylacrylic acid, 1-ethylacrylic acid, 1-n-butylacrylic acid, 1-n-hexylacrylic acid, 1-cyclohexylacrylic acid, $\alpha$-phenylacrylic acid, maleic acid, itaconic acid, crotonic acid and monobutyl maleate with a chlorine compound such as thionyl chloride, oxazolyl chloride, acetyl chloride, phosphorus pentachloride and phosphorus trichloride; reacting the resulting chlorinated compound with sodium azide to form an acid azide; heating the acid azide and releasing nitrogen gas to obtain a vinyl isocyanate; and blocking the vinyl isocyanate with an active hydrogen-containing compound such as mentioned above.

Specific instances of the active hydrogen-containing compound will now be illustrated.

1. Phenol Type

Phenol, cresol, xylene, nitrophenol, chlorophenol, ethylphenol, tert-butylphenol, hydroxybenzoic acid, hydroxybenzoic acid esters, 2,5-di-tert-butyl-4-hydroxytoluene, etc.

2. Lactam Type $\epsilon$-Caprolactam, $\delta$-valerolactam, $\gamma$-butyrolactam, $\beta$-propiolactam, etc.

3. Active Methylene Type

Diethyl malonate, dimethyl malonate, ethyl acetoacetate, methyl acetoacetate, acetylacetone, etc.

4. Alcohol Type

Methanol, ethanol, n-propyl alcohol, isopropyl alcohol, n-butyl alcohol, isobutyl alcohol, tert-butyl alcohol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, $\omega$-hydroperfluoro alcohol, acetocyanohydrin, etc.

5. Mercaptan Type

Butylmercaptan, hexylmercaptan, tert-butylmercaptan, tert-dodecylmercaptan, 2-mercaptobenzothiazole, thiophenol, methylthiophenol, ethylthiophenol, etc.

6. Acid Amide Type

Acetanilide, acetanisidide, acetotoluide, acrylamide, methacrylamide, acetamide, stearylamide, benzamide, etc.

7. Imide Type

Succinimide, phthalimide, maleimide, etc.

8. Amine Type

Diphenyl amine, phenylnaphthyl amine, xylidine, N-phenylxylidine, carbazole, aniline, naphthyl amine, butyl amine, dibutyl amine, butylphenyl amine, etc.

9. Imidazole Type

Imidazole, 2-ethylimidazole, etc.

10. Urea Type

Urea, thiourea ethylene urea, ethylene thiourea, 1,3-diphenylurea, etc.

11. Carbamate Type

Phenyl N-phenylcarbamate, 2-oxazolidone, etc.

12. Imine Type

Ethylene imine, etc.

13. Oxime Type

Formaldoxime, acetaldoxime, acetoxime, methylethylketoxime, diacetyl mono-oxime, benzophenone oxime, cyclohexanone oxime, etc.

14. Sulfite Type

Sodium bisulfite, potassium bisulfite, etc.

In this invention, in case the water-soluble resin (a) contains a latent isocyanate group, an ordinary copolymerizable unsaturated monomer can be used as the component (b) instead of the above latent isocyanate group-containing monomer. It is possible to employ this copolymerizable unsaturated monomer in combination with the above latent isocyanate group-containing monomer. In this case, the water-soluble resin may have a latent isocyanate group or it may not contain a latent isocyanate group. Any of ordinary, $\alpha,\beta$-ethylenically unsaturated monomers can be used as the "copolymerizable unsaturated monomer". For instance, there can be acrylic acid esters such as methyl acrylate, ethyl acrylate, n-propyl acrylate, isopropyl acrylate, n-butyl acrylate, tert-butyl acrylate and 2-ethylhexyl acrylate; methacrylic acid esters such as methyl methacrylate, ethyl methacrylate, n-propyl methacrylate, isopropyl methacrylate n-butyl methacrylate, tert-butyl methacrylate and 2-ethylhexyl methacrylate; monomers of the styrene series such as styrene, vinyltoluene and $\alpha$-methylstyrene; hydroxyl group-containing monomers such as 2-hydroxyethyl acrylate, 2-hydroxypropyl acrylate, 2-hydroxyethyl methacrylate, 2-hydroxypropyl methacrylate and allyl alcohol; unsaturated carboxylic acids such as arcylic acid and methacrylic acid; and other unsaturated monomers such as vinyl acetate, vinyl propionate, acrylonitrile, vinyl stearate, acrylic acetate, diallyl adipate, dimethyl itaconate, diethyl maleate, vinyl chloride, vinylidene chloride, ethylene, glycidyl methacrylate, N-methylol acrylamide, N-butoxymethyl acrylamide, acrylamide and diacetone acrylamide. These monomers can be used in the form of a mixture of two or more of them.

In this invention, the water-soluble resin (component (a)) and the latent isocyanate-containing monomer and/or copolymerizable unsaturated monomer (component (b)) are used in such amounts that the weight ratio of component (a):component (b) is within a range of from 10:90 to 95:5, preferably from 12:88 to 91:9. The amount of the latent isocyanate-containing monomer in the component (a) and/or the component (b) is 2 to 40% by weight, preferably 3 to 30% by weight, based on the total non-volatile solids. The content of the isocyanate group is 0.05 to 10% by weight, preferably 0.1 to 5% by weight, based on the total nonvolatile solids.

In this invention, it is desired that the ratio of the active hydrogen-containing group (especially -OH group) in the component (a) and/or the component (b) to the isocyanate group, namely the OH/NCO ratio, is within a range of from 0.3 to 5, preferably from 0.5 to 3.

In case the amount of the component (a) exceeds 95% by weight based on the sum of the components (a) and (b), defects involved in conventional aqueous dispersions of water-soluble resins, namely poor water resistance and alkali resistance in the resulting film, cannot be overcome. In case the amount of the component (a) is smaller than 10% by weight based on the sum of the components (a) and (b), the stability of the resulting aqueous dispersion is lowered and such undesired phenomena as phase separation and sedimentation occur and the objects of this invention cannot be attained sufficiently.

According to the process of this invention, the component (b) is homopolymerized or copolymerized in water in the presence of the component (a) with use of a polymerization initiator. The homopolymerization or copolymerization is carried out at a temperature lower than the isocyanate-releasing temperature. In general, it is preferred that the polymerization in conducted at a temperature ranging from room temperature to 100°C. in the presence of a polymerization catalyst for 5 to 20 hours.

As mentioned above, in this invention the component (b) is homopolymerized or copolymerized in the presence of the component (a). In case the component (a) contains an unsaturated bond, the monomeric component (b) is copolymerized with said unsaturated bond. In case the component (a) has no unsaturated bond, the monomeric component (b) is homopolymerized or, when two or more monomers are used as the component (b), they are copolymerized. In short, in each case the component (a) functions to keep the resulting dispersed particles stable in water. For instance, in the former case, the resulting polymer particles can be stably dispersed in water by the chemical linkage between the water-soluble resin and polymer particles, and in the latter case, the resulting polymer particles can be stably dispersed in water by entanglement of the polymer particles with the water-soluble resin.

In this invention, it is preferred that the amount of water is so adjusted that the concentration of the resulting polymeric product is not higher than 80% by weight. If necessary, it is possible to employ a water-soluble or partially water-soluble organic solvent in combination with water. In view of the stability of the catalyst at the polymerization reaction, it is preferred that the pH value of the starting aqueous solution is below 9.

By the term "isocyanate-releasing temperature" used in the instant specification and claims is meant a temperature at which the active isocyanate group is released from the latent isocyanate group-containing monomer. This temperature varies depending on the kind of such monomer, but it is generally within a range of from about 100° to about 300°C.

The above homopolymerization or copolymerization is preferably carried out in a nitrogen current, but it is not absolutely necessary to substitute the polymerization atmosphere with nitrogen.

The homopolymerization or copolymerization of the component (b) in the presence of the component (a) can be performed, for instance, by such methods as (1) a method comprising adding a mixture of components (a) and (b) dropwise to water, (2) a method comprising dissolving the component (a) into water and adding the component (b) dropwise to the resulting solution, and (3) a method comprising dissolving a part of the component (a) in water and adding a mixture of the remaining component (a) and the component (b) dropwise to the resulting solution.

As the polymerization initiator to be used in the process of this invention, there can be mentioned, for instance, known inorganic peroxide compounds such as potassium persulfate, ammonium persulfate, hydrogen peroxide and percarbonates; known organicperoxides such as acyl peroxides (for instance, benzoyl peroxide), alkyl hydroperoxides (for instance, tert-butyl hydroperoxide and p-methane hydroperoxide) and dialkyl peroxides (for instance, di-tert-buty peroxide); and known nitrile type initiators such as $\alpha,\alpha'$-azobisisobutyronitrile. Inorganic or organic peroxide compounds can be combined with reducing agents and used in the form of a redox catalyst. As the reducing agent, there can be employed, for instance, acidic sodium sulfite, sodium sulfite, acidic potassium sulfite, potassium sulfite, sodium hydrosulfite, potassium hydrosulfite, sodium-formaldehyde sulfoxylate, potassium-formaldehyde sulfoxylate, zinc-formaldehyde sulfoxylate.

In this invention, the polymerization initiator is used in an amount usually adopted in the polymerization of this type. Namely, it is used in an amount of 0.01 to 5% by weight of total monomers used as the component (b). If desired, in order to adjust the molecular weight of the resulting polymer, a chain transfer agent such as mercaptan derivatives can be used in combination with the polymerization initiator.

In case it is intended to incorporate a dye or pigment in the so obtained aqueous thermosetting resinous composition, an organic or inorganic pigment or dye customarily used in this field is kneaded directly into the composition by means of a three roll mill, a pebble mill or a sand grinder according to customary procedures. In short, incorporation of such coloring material can be accomplished by kneading according to customary methods adopted in the case of ordinary solvent type paints. In this point, the composition of this invention is advantageous over conventional emulsion paints, and it can be applied in various fields within a broader range.

The so formed synthetic polymer aqueous dispersion or coloring material-incorporated dispersion can be directly used as a thermosetting coating composition to be applied to a substrate or article to be coated.

This invention also includes an embodiment where the above aqueous dispersion or coloring material-incorporated dispersion is spray-dried according to customary known procedures to obtain a powdery thermosetting coating composition. In case spray-drying is carried out with use of, for instance, a spray drier, it is preferred that the air temperature at the inlet of the drier is above the boiling point of water and the air temperature at the outlet of the drier is below either the isocyanate-releasing temperature or the softening point of the resin. In general, the outlet temperature is adjusted to a level not exceeding 100°C.

The powder obtained by the spray-drying has a particle size of 0.01 to 1000µ, preferable 5 to 200µ.

It is possible to incorporate in the composition of this invention an isocyanate-releasing catalyst such as, for example, organic tin compounds, organic zinc compounds and organic amine compounds.

Further, it is possible, if necessary, to combine the composition of this invention with a minor amount (less than 50% by weight) of an amino resin such as a melamine resin or benzoguanamine resin, a polyamide resin, a phenol resin, an epoxy resin or a polyester resin.

In this invention, even if a surfactant or thickener is not used in such a large amount as used in conventional emulsion paints, a sufficiently stable composition can be obtained. If desired, an emulsifier or protective colloid such as used in the conventional emulsion polymerization technique can be added in such an amount as will not have bad influences on properties of the resulting film. As such additive, there can be mentioned surfactants such as non-ionic surfactants and anionic surfactants, and water-soluble protective colloids such as polyvinyl alcohol, hydroxyethyl cellulose, carboxymethyl cellulose, methyl cellulose, sodium acrylate, gelatin, gum arabic and polyoxyethylene glycol.

The so obtained composition of this invention is stable at temperatures not exceeding the isocyanate-releasing temperature. Since the composition of this invention is self-cross-linkable, as compared with a curing agent-incorporated system, the composition of this invention is advantageous in that the phase separation or sedimentation does not occur during storage and it has a good storage stability.

When the composition of this invention is baked at a temperature exceeding the isocyanate-releasing temperature, the active isocyanate group full of reactivity is released and reacts with active hydrogen-containing groups (such as -OH and -COOH groups) contained in the water-soluble resin and/or the polymer component to form urethane linkages, urea linkages and the like which give good properties to the resulting film.

Still in addition since the cross-linking of the composition of this invention is accomplished by the isocyanate group contained in the solid components of the composition, formation of formalin such as observed in melamine type compositions is not brought about. This is another advantage of the composition of this invention.

The composition of this invention is very useful and valuable as a coating composition. When it is used in the form of an aqueous dispersion, it can be applied to a substrate or article to be coated according to customary coating methods such as brush coating, spray coating and electrostatic coating methods. When the composition is used in the form of powdery composition, coating can be accomplished by such customary methods as fluidized bed coating, electrostatic powder coating, electrostatic fluidized bed coating, sprinkling and spraying methods.

As a substrate or article to be coated, there can be mentioned, for instance, plates of metals such as iron, steel, aluminum and zinc, plywood, slate plates, plastics and the like. When the composition of this invention is applied as a coat on such substrate and heated at a temperature exceeding the isocyanate-releasing temperature, preferable 100° to 250°C., for 10 to 60 minutes, a cross-linked film excellent in water resistance, alkali resistance and other properties can be obtained.

This invention will now be illustrated more detailedly by reference to Examples, in which all of the "parts" and "percentages" are on the weight basis unless otherwise indicated.

PREPARATION OF LATENT-ISOCYANATE-CONTAINING MONOMER

EXAMPLE 1

A. A reaction vessel equipped with a dropping funnel, a stirrer, a thermometer and a cooler was charged with 100 parts of 2,4-tolylene diisocyanate, and a mixture of 54 parts of phenol and 0.5 part of triethylene diamine was added dropwise over a period of 30 minutes while maintaining the reaction temperature at 60°C. After completion of the dropwise addition, the reaction was further continued for 60 minutes. After completion of the reaction, a 1:1 mixed solvent of hexane and benzene was added to the reaction mixture to extract the unreacted isocyanate and remove it. Then, 100 parts of ethyl acetate was added to the residue and the di-blocked product, which was not dissolved in ethyl acetate, was separated by filtration.

Then, 74.9 parts of 2-hydroxyethyl methacrylate, 74.9 parts of dioxane and a minute amount of m-dinitrobenzene were added to the filtrate and the mixture was maintained at 60°C. for 40 minutes. The resulting reaction mixture liquid was poured into a large excess of petroleum ether to obtain a white powdery, latent isocyanate-containing monomer (hereinafter designated as "latent isocyanate-containing monomer (I)").

B. A round-bottom flask equipped with a cooler was charged with 44 parts of methacrylic acid, 0.5 part of hydroquinone and 90 parts of thionyl chloride, and they were reacted for 24 hours in the dark. Then, the temperature was elevated to 40°C. and this temperature was maintained for 30 minutes to complete the reaction. After completion of the reaction, excessive thionyl chloride was removed by distillation under reduced pressure to obtain methacryloyl chloride. Separately, a reaction vessel equipped with a stirrer, a dropping funnel and a cooler was charged with 25 parts of sodium azide, 40 parts of ethyl alcohol and 60 parts of xylene, and the mixture was agitated for a while. Then, 30 parts of the above methacryloyl chloride was added dropwise to the mixture promptly, and the temperature was gradually elevated and maintained at 50° to 60°C. When agitation was continued at this temperature, nitrogen gas was generated and the reaction was terminated within 4 hours.

The reaction mixture was cooled to room temperature, and precipitated crystals of sodium chloride were separated by filtration to obtain a latent isocyanate-containing monomer (hereinafter designated as "latent isocyanate-containing monomer (II)").

C. Procedures mentioned in (B) above were repeated in the same manner except that 115 parts of ε-caprolactam was used instead of 40 parts of ethyl alcohol, to obtain a latent isocyanate-containing monomer (hereinafter designated as "latent isocyanate-containing monomer (III)").

D. Procedures mentioned in (A) above were repeated in the same manner except that 4,4'-methylene-bis(cyclohexyl isocyanate) was employed as the isocyanate, cyclohexanone oxime was used as the blocking agent and 2-hydroxypropyl methacrylate was used as the active hydrogen-containing monomer, to thereby obtain a latent isocyanate-containing monomer (hereinafter designated as "latent isocyanate-containing monomer (IV)").

PREPARATION OF WATER-SOLUBLE RESIN

EXAMPLE 2 a. A reaction vessel was charged with 52.2 parts of refined linseed oil and 8.64 parts of maleic anhydride, and they were reacted at 250°C. for 5 hours under agitation in a nitrogen current to obtain a maleic linseed oil having an acid value of 120. Then, 15 parts of triethyl amine was added to 100 parts of the maleic linseed oil, and the mixture was heated at 50°C. and agitated at this temperature for 30 minutes, to obtain a neutralized maleic linseed oil (hereinafter designated as "water-soluble resin (a)").

b. 100 parts of the above maleic linseed oil (unneutralized one) was incorporated with 40 parts of butyl cellosolve, and they were reacted at 120°C. for 2 hours to effect partial esterification and obtain a resinous product having an acid value of 60. At room temperature 3 parts of 30% aqueous ammonia and 94 parts of water were added to 70 parts of this resinous product, and the mixture was sufficiently agitated to obtain an aqueous solution of a maleic linseed oil having a pH value of 7.5 and a solid content of 30% (hereinafter designated as "water-soluble resin (b)").

c. A 1-liter capacity, 4-neck flask was charged with 49 parts of phthalic anhydride, 123 parts of diallyl phthalate, 73 parts of adipic acid, 14 parts of dehydrated castor oil fatty acid, 75 parts of triethylene glycol and 106 parts of diethylene glycol, and condensation reaction was conducted at 220°C. for 18 hours to obtain an unsaturated polyester resin having an acid value of 76.

100 parts of the so obtained resin was incorporated with 9 parts of triethyl amine and 10 parts of ethyl cellosolve, and the mixture was agitated at 70°C. for about 1 hour to obtain a neutralized, unsaturated polyester resin having a non-volatile component content of 82.5% (hereinafter designated as "water-soluble resin (c)").

d. A mixture of 0.5 part of α,α'-azobisisobityronitrile, 20 parts of ethyl acrylate, 20 parts of styrene, 20 parts of 2-ethylhexyl acrylate, 10 parts of 2-hydroxyethyl methacrylate and 40 parts of acrylic acid was added dropwise over a period of 2 hours to 60 parts of butyl cellosolve maintained at 85°C. under agitation. After completion of the dropwise addition, the polymerization was further continued for 4 hours to obtain an acrylic resin having an acid value of 300. 20 parts of triethyl amine was added to 160 parts of the so obtained resin to obtain a neutralized acrylic resin solution having a non-volatile component content of 55.5% (hereinafter designated as "water-soluble resin (d)").

e. A mixture of 0.5 part of α,α'-azobisisobutyronitrile, 49.3 parts of ethyl arylate, 30 parts of 1,1'-dimethyl-1-(2-hydroxypropyl)amine methacrylimide, 10 parts of 2-ethylhexyl acrylate, 20 parts of 2-hydroxyethyl acrylate and 0.7 part of acrylic acid was added dropwise over a period of 2 hours to 60 parts isopropyl alcohol maintained at 85°C. under agitation, and the polymerization was further continued for 4 hours to obtain a viscous polymer solution having a non-volatile component content of 62.5%. The acid value of the so obtained resin was 5. Then, 0.7 part of triethyl amine and 169 parts of water are added to 160 parts of the above resin solution to obtain a water-soluble resin solution having a pH value of 7.4 and a non-volatile component content of 30% (hereinfater designated as "water-soluble resin (e)").

f. A mixture of 60 parts of isopropyl alcohol, 40 parts of styrene, 40 parts of methyl methacrylate, 20 parts of acrylic acid and 1 part of α,α'-azobisisobutyronitrile was subjected to the solution polymerization according to a known method to obtain a resin having a acid value of 150. 10 parts of triethyl amine was added to 160 parts of the so obtained resin to obtain an acrylic resin solution having a non-volatile component content of 60.0% (hereinafter designated as "water-soluble resin (f)").

g. A mixture of 60 parts of isopropyl alcohol, 40 parts of 2-hydroxyethyl methacrylate, 40 parts of styrene, 10 parts of methyl methacrylate, 10 parts of acrylic acid and 1 part of benzoyl peroxide was subjected to solution polymerization according to a known method to obtain a resin having an acid value of 75.5 parts of triethyl amine was added to 160 parts of the obtained resin to obtain a water-soluble resin solution having a non-volatile component content of 60.0% (hereinafter designated as "water-soluble resin (g)").

(h). In the same manner as in (g) above, a water-soluble resin having an acid value 70 was prepared from 60 parts of isopropyl alcohol, 80 parts of methyl methacrylate, 10 parts of stearyl methacrylate, 10 parts of methacrylic acid and 1 part of benzoyl peroxide. 5 parts of triethyl amine was added to 160 parts of the so obtained resin to obtain a water-soluble resin solution having a non-volatile component content of 60.0% (hereinafter designated as "water-soluble resin (h)").

i. A water-soluble resin having an acid value of 70 was prepared in the same manner as described above from 60 parts of isopropyl alcohol, 30 parts of latent isocyanate-containing monomer (III), 30 parts of methyl methacrylate, 30 parts of styrene, 10 parts of methacrylic acid and 1 part of α,α'-azobisisobutyronitrile. 5 parts of triethyl amine was added to the so obtained resin to obtain a water-soluble resin solution having a non-volatile component content of 60.0% (hereinafter designated as "water-soluble resin (i)").

j. A water-soluble resin having an acid value of 7 was prepared in the same manner as described above from 60 parts of isopropyl alcohol, 30 parts of 1,1'-dimethyl-1-(2-hydroxypropyl)-amine methacrylimide, 29 parts of methyl methacrylate, 30 parts of 2-hydroxyethyl methacrylate, 10 parts of styrene, 1 part of methacrylic acid and 1 part of α,α'-azobisisobutyronitrile. 0.7 part of triethyl amine was added to the so obtained resin to form a water-soluble resin solution having a nonvolatile component content of 60.0% (hereinafter designated as "water-soluble resin (j)").

PREPARATION OF THERMOSETTING RESINUOUS COMPOSITION

EXAMPLE 3

115 parts of the above water-soluble resin (a) was dissolved in a mixture of monomers composed of 1 part of benzoyl peroxide, 50 parts of ethyl acrylate, 30 parts of styrene, 7.5 parts of 2-hydroxyethyl methacrylate and 12.5 parts of the above latent isocyanate-containing monomer (I), and the resulting mixture was added dropwise over a period of 2 hours to 185 parts of water maintained at 80°C. under agitation. The reaction was further continued at 80°C. for 6 hours to obtain a solvent-free, milky white, aqueous dispersion-type, thermosetting composition having a viscosity of W as measured at 20°C. according to Gardner-Holdt method and a solid content of 50%.

When the composition was applied in a coat to an iron plate and baked at 175°C. for 20 minutes, the released active isocyanate group was reacted with the hydroxyl group and other active hydrogen-containing group in the solid-constituting components, and a glossy film excellent in solvent resistance and water resistance was obtained.

EXAMPLE 4

100 parts of the above water-soluble resin (b) was charged in a reaction vessel, and the temperature was adjusted to 80°C. under agitation.

A mixture composed of 0.2 part of benzoyl peroxide, 14 parts of ethyl acrylate, 6 parts of the above latent isocyanate-containing monomer (II) and 10 parts of styrene was added dropwise over a period of 2 hours to the above resin solution. The reaction was further continued for 6 hours at 80°C. to obtain a milky white, aqueous dispersion-type, thermosetting composition having a viscosity of V-W as measured at 20°C. according to Gardner-Holdt method and a solid content of 46%.

When the so obtained composition was applied in a coat to an iron plate and baked at 160°C. for 30 minutes, a film having good properties similar to those of the film obtained in Example 3 was obtained.

EXAMPLE 5

0.4 part of polyethylene lauryl glycol ether was added to 215 parts of the above water-soluble resin (a) diluted with the same mixture of monomers as used in Example 3, and the mixture was added dropwise to 185 parts of water heated at 80°C. to effect the reaction in the same manner as in Example 3. As a result, there was obtained a milky white, aqueous dispersion-type, thermosetting composition having a viscosity of X as measured at 20°C. according to Gardner-Holdt method and a solid content of 50%.

When the so obtained composition was applied in a coat to an iron plate and baked at 175°C. for 20 minutes, there was obtained a film of good property similar to the film prepared in Example 3.

EXAMPLE 6

123 parts of the above water-soluble resin (c) was diluted with a mixture of monomers composed of 0.5 part of benzoyl peroxide, 10 parts of acrylonitrile, 20 parts of methyl acrylate, 10 parts of 1,1'-dimethyl-1-(2-hydroxypropyl)amine methacrylimide and 10 parts of styrene, and the resulting mixture was added dropwise under agitation over a period of 2 hours to 127 parts of water heated at 80°C. The reaction was further conducted for 6 hours to obtain a milky white, aqueous dispersion-type, thermosetting composition having a viscosity of X as measured at 20°C. according to Gardner-Holdt method and a solid content of 50%.

When the so obtained composition was applied in a coat to an iron plate and baked at 180°C. for 20 minutes, there was obtained a glossy film excellent in such properties was solvent resistance and water resistance.

EXAMPLE 7

180 parts of the above water-soluble resin (d) was diluted with a mixture composed of 2 parts of $\alpha,\alpha'$-azobisisobutyronitrile, 100 parts of ethyl acrylate, 50 parts of 2-hydroxyethyl acrylate, 25 parts of the above latent isocyanate-containing monomer (II) and 25 parts of methyl methacrylate, and under agitation the resulting mixture was added dropwise over a period of 2 hours to 340 parts of water heated at 80°C. The polymerization was further continued for 5 hours to obtain a stable, aqueous dispersion-type, thermosetting composition having a viscosity of X as measured at 20°C. according to Gardner-Holdt method and a solid content of 50%. When the so obtained composition was applied in a coat to an iron plate and baked at 180°C. for 20 minutes, a film having good water resistance, corrosion resistance and solvent resistance was obtained.

EXAMPLE 8

100 parts of the above water-soluble resin (e) was maintained at 80°C. under agitation, and a mixture composed of 0.2 parts of benzoyl peroxide, 15 parts of ethyl acrylate, 7.5 parts of 2-hydroxyethyl methacrylate, 7 parts of styrene and 0.5 part of acrylic acid was added dropwise over a period of 2 hours to the above resin solution. The polymerization was further conducted for 5 hours to obtain a stable, aqueous dispersion-type, thermosetting composition having a viscosity of Y-Z as measured at 20°C. according to Gardner-Holdt method and a solid content of 46%.

When the so obtained composition was applied in a coat to an iron plate and baked at 180°C. for 30 minutes, a glossy film excellent in water resistance, solvent resistance and physical properties was obtained.

EXAMPLE 9

The polymerization reaction was conducted in the same manner as in Example 3 except that 1 part of ammonium persulfate was used instead of benzoyl peroxide employed as the polymerization initiator in Example 3 and it was dissolved in water to effect the reaction. A thermosetting composition having the same viscosity as that of the composition obtained in Example 3 was obtained. Properties of a film prepared from the so obtained composition were as good as those of the film formed in Example 3.

EXAMPLE 10

A mixture of 123 parts of the above water-soluble resin (c) with 67 parts of water and 60 parts of ethyl cellosolve was charged in a reaction vessel, and the temperature was controlled to 80°C. under agitation. Then, a mixture composed of 1 part of benzoyl peroxide, 10 parts of acrylonitrile, 20 parts of methyl methacrylate, 10 parts of 1,1'-dimethyl-1-(2-hydroxypropyl-)amine methacrylimide and 10 parts of styrene was added dropwise over a period of 2 hours to the charge of the reaction vessel, and the reaction was further continued for 6 hours to obtain a milky white, aqueous dispersion-type, thermosetting composition having a solid content of 50%.

The so obtained composition had a good film-forming property similar to that of the composition obtained in Example 6.

EXAMPLE 11

180 parts of the above-soluble resin (d) was diluted with a mixture composed of 150 parts of 1,1-dimethyl-1-(2-hydroxypropyl)amine methacrylimide, 200 parts of ethyl acrylate. 200 parts of styrene and 150 parts of 2-hydroxyethyl acrylate. The resulting mixture was added dropwise over a period of 3 hours to a solution of 4.5 parts of ammonium persulfate in 920 parts of water, which was heated at 80°C. under agitation. At this time, 4.5 parts of sodium thiosulfate was added dividely in 5 times. After completion of the dropwise addition, the polymerization was further continued for 5 hours to obtain a stable, aqueous dispersion-type, thermosetting composition having a viscosity of Y as measured at 20°C. according to Gardner-Holdt method and a solid content of 50%.

When the so obtained composition was applied in a coat to an iron plate and baked at 180°C. for 30 minutes, a film excellent in such properties as water resistance, corrosion resistance and solvent resistance was obtained.

EXAMPLE 12

316 parts of the above water-soluble resin (b) was charged in a reaction vessel and the temperature was controlled to 80°C. under agitation.

0.5 part of benzoyl peroxide was dissolved in the above resin solution, and 10 parts of the above latent isocyanate-containing monomer (I) was added thereto. The mixture was reacted at 80°C. for 6 hours to obtain an aqueous dispersion-type, thermosetting composition having a solid content of 31%.

The so obtained composition was applied in a coat to an iron plate and baked at 160°C. for 30 minutes to obtain a film excellent in such properties as flexibility.

EXAMPLE 13

The composition obtained in Example 3 was incorporated with titanium oxide, and the mixture was kneaded by a three roll mill, a pebble mill or a sand mill. In each case, such undesired phenomena as sedimentation, phase separation and particle destruction did not occur.

Each of the kneaded mixtures was applied in a coat to an iron plate and baked at 175°C. for 20 minutes. In each case there was obtained a glossy film excellent in water resistance and physical properties.

EXAMPLE 14

The composition obtained in Example 11 was kneaded with titanium oxide in the same manner as in Example 13 and the resulting mixture was spray-dired to obtain a powdery thermosetting composition having an average particle size of 25 μ. The powder was electrostatically applied in a coat to an iron plate and baked at 180°C. for 30 minutes to obtain a film having good properties similar to those of the film obtained in Example 11.

EXAMPLE 15

A liquid mixture composed of 85 parts of the above water-soluble resin (f), 25 parts of 2-hydroxypropyl methacrylate, 25 parts of the above latent isocyanate-containing monomer (III), 20 parts of methyl methacrylate, 20 parts of 2-ethylhexyl methacrylate, 10 parts of isobutyl methacrylate, 1 part of α,α'-azobisisobutyronitrile and 1 part of dodecylmercaptan was added dropwise under agitation over a period of 3 hours to 150 parts of water maintained at 80°C. in a reaction vessel, and the reaction was further continued for 5 hours to obtain a stable polymer dispersion having a viscosity of X as measured at 20°C. according to Gardner-Holdt method and a solid content of 45%. The resulting dispersion was incorporated with 2 parts of dimethyltin dilaurate and 1 part of Modaflow (trademark for a flow adjuster manufactured by Monsanto Chemicals Co.), and the additives were uniformly dispersed. Then, the mixture was spray-dried in a spray-drying furnace in which the inlet temperature was 200°C. and the outlet temperature was 75°C., to thereby obtain a powdery thermosetting composition having an average particle size of 50 μ and excellent flow characteristics. When the so obtained powdery composition was electrostaticaly applied in a coat to a substrate and baked at 180°C. for 30 minutes, there was obtained a film havving a smooth surface and being excellent in flexibility and other properties.

EXAMPLE 16

A liquid mixture composed of 170 parts of the above water-soluble resin (g), 30 parts of the above latent isocyanate-containing monomer (III), 20 parts of methyl methacrylate, 50 parts of butyl acrylate, 0.5 part of dodecylmeroaptan (chain transfer agent), 1.0 part of benzoyl peroxide, 1.0 part of Modaflow (flow adjuster) and 1.0 part of dibutyl tin dilaurate (isocyanate-releasing catalyst) was suspended under agitation into 200 parts of water heated at 90°C. in a reaction vessel, and the reaction was conducted for 3 hours to obtain a stable polymer dispersion having a solid content of 43%.

The resulting dispersion was spray-dried to obtain a powdery thermosetting composition of an average particle size of 150 μ excellent in flow characteristics. When this powdery composition was applied in a coat to a preheated iron plate according to the fluidized bed coating method and baked at 180°C. for 30 minutes, there was obtained a smooth transparent film excellent in flexibility and other physical properties.

EXAMPLE 17

170 parts of the above water-soluble resin (h) and 140 parts of water were charged in a reaction vessel, and the temperature of the resulting mixture was controlled to 80°C. under agiation. Then, a liquid mixture composed of 10 parts of acrylonitrile, 20 parts of ethyl acrylate, 20 parts of 2-hydroxyethyl methacrylate, 50 parts of the above latent isocyanate-containing monomer (IV), 5 parts of α,α'-azobisisobutyronitrile, 1 part of zinc octanoate and 1 part of Modaflow was added dropwise to the above mixture over a period of 1 hour. After completion of the dropwise addition, the temperature was elevated to 90°C. and the reaction was conducted for 3 hours to obtain a stable polymer dispersion having a solid content of 50%.

The resulting polymer dispersion was spray-dried to obtain a powdery thermosetting composition composed of spherical particles having an average particle size of 40 $\mu$.

The powder was applied in a coat to an iron plate and baked at 160°C. for 30 minutes to obtain a smooth transparent film excellent in physical properties.

EXAMPE 18

A liquid mixture composed of 170 parts of the above water-soluble resin (i), 20 parts of 2-hydroxypropyl methacrylate, 30 parts of 2-ethylhexyl methacrylate, 40 parts of methyl methacrylate, 10 parts of the above latent isocyanate-containing monomer (III), 4 parts of $\alpha,\alpha'$-azobisisobutyronitrile, 1 part of Modaflow and 0.5 part of tetra-n-butyl-1,3-diacetoxystannoxane (isocyanate-releasing catalyst) was added dropwise under agitation over a period of 2 hours to 140 parts of water heated at 80°C. After completion of the dropwise addition, the reaction was further continued for 3 hours to obtain a stable polymer dispersion having a solid content of 50%.

The polymer dispersion was spray-dried to obtain a powder thermosetting composition composed of spherical particles of an average particle size of 50 $\mu$ and excellent in flow characteristics and storage stability.

The so obtained powder was applied in a coat to an iron plate and baked at 160°C. for 30 minutes to obtain a film as excellent as films obtained in the preceding Examples.

EXAMPLE 19

A liquid mixture composed of 170 parts of the above water-soluble resin (j), 50 parts of styrene, 20 parts of 2-ethylhexyl methacrylate, 20 parts of butyl acrylate, 10 parts of methyl methacrylate, 10 parts of Epikote No. 1001 (trademark for an epoxy resin manufactured by Shell International Chemicals Corp.) and 1 part of Modaflow was added dropwise under agitation over a period of 2 hours to 150 parts of water heated at 80°C. After completion of the dropwise addition, the reaction was further continued for 3 hours to obtain a stable polymer dispersion having a solid content of 50%. The so obtained dispersion was spray-dried to obtain a powdery thermosetting composition composed of spherical particles of an averagbe particle size of 50 $\mu$ and excellent in flow characteristics and storage stability. The so obtained powder was applied in a coat to an iron plate and baked at 180°C. for 20 minutes to obtain a film as excellent as those obtained in the preceding Examples.

EXAMPLE 20

100 parts each of polymer dispersions obtained in Examples 15 to 19 were incorporated with 10 parts of titanium dioxide and the resulting mixture were kneaded by a three roll mill and spray-dried to obtain powdery thermosetting compositions which were as excellent in storage stability as those obtained in Examples 15 to 19. Each powdery composition was applied in a coat to substrate and baked under the same conditions as in Examples 15 to 19. In each case, there was obtained a film excellent in smoothness, gloss and physical properties.

What we claimed is:

1. A process for the preparation of thermosetting resinous compositions which comprises homopolymerizing or copolymerizing (b) and $\alpha,\beta$-ethylenically unsaturated monomer capable of releasing an isocyanate group under heating or a mixture of said $\alpha,\beta$-ethylenically unsaturated monomer and other unsaturated monomer copolymerizable therewith in water at a temperature lower than the isocyanate-releasing temperature in the presence of (a) a water-soluble resin having an acid group of an acid value of 5 to 3000 neutralized with a basic substance and being free of a group capable of releasing an isocyanate group under heating, to thereby obtain an aqueous polymer dispersion, said unsaturated monomer or monomer mixture being copolymerized with the water-soluble resin when the latter has an unsaturated bond, and being homopolymerized in the case of an unsaturated monomer or copolymerized in the case of a monomer mixture when the water-soluble resin has no unsaturated bond, the content of said isocyanate groups being from 0.05 to 10% by weight based on the total non-volatile solids, at least one of said components (a) and (b) containing active hydrogen-containing groups in components (a) and (b) being within the range of from 0.3 to 0.5, and the non-volatile component weight ratio of component (a) to component (b) being within a range of from 10:90 to 95:5.

2. A process according to claim 1 wherein the amount of the $\alpha,\beta$-ethylenically unsaturated monomer capable of releasing an isocyanate group under heating is 2 to 40% by weight based on the total non-volatile components.

3. A process according to claim 1 wherein the $\alpha,\beta$-ethylenically unsaturated monomer capable of releasing an isocyanate group under heating is a member selected from the group consisting of (1) amine imide monomers, (2) polyisocyanates in which one of the isocyanate groups is reacted with an $\alpha,\beta$-ethylenically unsaturated monomer having an active hydrogen-containing group and the remaining isocyanate groups are blocked with an active hydrogen-containing compound, and (3) vinyl isocyanate compounds blocked with an active hydrogen-containing compound.

4. A process according to claim 1 wherein the water-soluble resin is a member selected from the group consisting of alkyd resins, acrylic resins, maleic oil resins nd epoxy ester resins, each having an acid value of 5 to 300.

5. A process for the preparation of powdery thermosetting resinous compositions which comprises homopolymerizing or copolymerizing (b) an $\alpha,\beta$-ethylenically unsaturated monomer capable of releasing an isocyanate group under heating or a mixture of said $\alpha,\beta$-ethylenically unsaturated monomer and other unsaturated monomer copolymerizable therewith in water at a temperature lower than the isocyanate-releasing temperature in the presence of (a) a water-soluble resin having an acid group of an acid value of 5 to 300 neutralized with a basic substance and being free of a group capable of releasing an isocyanate group under heating, to thereby obtain an aqueous polymer dispersion, said unsaturated monomer or monomer mixture being copolymerized with the water-soluble resin when the latter has an unsaturated bond, and being homopolymerized in the case of an unsaturated monomer or copolymerized in the case of a monomer mixture when the water-soluble resin has no unsaturated bond, the content of said isocyanate groups being from 0.05 to 10% by weight based on the total non-volatile solids, at least one of said components (a) and (b) containing active hydrogen-containing groups and the ratio of said active hydrogen-containing groups in components (a) and (b) being within the range of from 0.3 to 0.5, and the non-volatile component weight ratio of component (a) to component (b) being within the range of from 10:90 to 95:5, and spray-drying the so obtained aqueous polymer dispersion at a temperature lower than the isocyanate-releasing temperature.

6. A process for the preparation of thermosetting resinous compositions which comprises homopolymerizing or copolymerizing (b) an α,β-ethylenically unsaturated monomer being free of a group capable of releasing an isocyanate group under heating or a mixture of said α,β-ethylenically unsaturated monomer and an α,β-ethylenically unsaturated monomer capable of releasing an isocyanate group under heating in water at a temperature lower than the isocyanate-releasing temperature in the presence of (a) a water-soluble resin having an acid group of an acid value of 5 to 300 neutralized with a basic substance and containing a group capable of releasing an isocyanate group under heating, to thereby obtain an aqueous polymer dispersion, said unsaturated monomer or monomer mixture being copolymerized with the water-soluble resin when the latter has an unsaturated bond, and being homopolymerized in the case of an unsaturated monomer or copolymerized in the case of a monomer mixture when the water-soluble resin has no unsaturated bond, the content of said isocyanate groups being from 0.15 to 10% by weight based on the total non-volatile solids, at least one of said components (a) and (b) containing active hydrogen-containing groups and the ratio of said active hydrogen-containing groups in components (a) and (b) being within the range of from 0.3 to 0.5, and the non-volatile component weight ratio of component (a) to component (b) being within a range of from 10:90 to 95.:5.

7. A process according to claim 5 wherein the amount of the α,β-ethylenically unsaturated monomer capable of releasing an isocyanate group under heating, which is contained in the component (a) or the components (a) and (b) is 2 to 40% by weight based on the total non-volatile components.

8. A process according to claim 6 wherein the α,β-ethylenically unsaturated monomer capable of releasing an isocyanate group under heating is a member selected from the group consisting of (1) amine imide monomers, (2) polyisocyanates in which one of the isocyanate groups is reacted with an α,β-ethylenically unsaturated monomer having an active hydrogen-containing group and the remaining isocyanate groups are blocked with an active hydrogen-containing compound, and (3) vinyl isocyanate compounds blocked with an active hydrogen-containing compound.

9. A process according to claim 6 wherein the water-soluble resin is a member selected from the group consisting of alkyd resins, acrylic resins, maleic oil resins and epoxy ester resins, each having an acid value of 5 to 300 and containing a group capable of releasing an isocyanate group under heating.

10. A process for the preparation of powdery thermosetting resinous compositions which comprises homopolymerizing or copolymerizing (b) an α,β-ethylenically unsaturated monomer being free of a group capable of releasing an isocyanate group under heating or a mixture of said α, β-ethylenically unsaturated monomer and an α,β-ethylenically unsaturated monomer capable of releasing an isocyanate group under heating in water at a temperature lower than the isocyanate-releasing temperature in the presence of (a) a water-soluble resin having an acid group of an acid value of 5 to 300 neutralized with a basic substance and containing a group capable of releasing an isocyanate group under heating, to thereby obtain an aqueous polymer dispersion, said unsaturated monomer or monomer mixture being copolymerized with the water-soluble resin when the latter has an unsaturated bond, and being homopolymerized in the case of an unsaturated monomer or copolymerized in the case of a monomer mixture when the water-soluble resin has no unsaturated bond, the content of said isocyanate groups being from 0.05 to 10% by weight based on the total non-volatile solids, at least one of said components (a) and (b) containing active hydrogen-containing groups and the ratio of said active hydrogen-containing groups in components (a) and (b) being within the range of from 0.3 to 0.5, and the non-volatile component weight ratio of component (a) to component (b) being within a range of from 10:90 to 95:5, and spray-drying the so obtained aqueous polymer dispersion at a temperature lower than the isocyanate-releasing temperature.

* * * * *